UNITED STATES PATENT OFFICE 2,408,893

CHOLINE-LIKE COMPOUNDS

Kenneth C. Swan and Norman G. White,
Iowa City, Iowa

No Drawing. Application August 7, 1943,
Serial No. 497,858

4 Claims. (Cl. 260—482)

This invention relates to a new class of carbamic acid esters of compounds of the choline type, which substances exhibit valuable pharmacological properties. The new compounds may be represented by the formula:

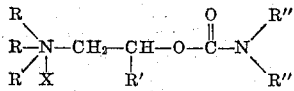

wherein R is selected from the group consisting of lower alkyl radicals; X is an anion; R' is selected from the group consisting of hydrogen and lower alkyl radicals; and R'' is selected from the group consisting of alkyl radicals having more than three carbon atoms, and aryl radicals.

We have found that, whereas other compounds of the choline series, such as acetylcholine chloride, and carbaminoyl choline chloride, and derivatives in which the hydrogens attached to the nitrogen of the carbamate group are replaced by small polar groups, that is, radicals containing less than four carbon atoms, produce constriction of the pupil and contraction of the ciliary muscle when administered to individuals, the compounds of our invention, in which the hydrogens attached to the nitrogen of the carbamate group are replaced by large, non-polar groups, that is, radicals containing more than three carbon atoms, exhibit a reverse action in that they exhibit mydriatic and cycloplegic properties.

While we do not wish to commit ourselves to any definite theory as to the cause of the reversal of activity experienced with our new products, in which highly hydrophilic choline salts are combined by an ester linkage with highly hydrophobic groups, it appears that the unexpected properties exhibited by the compounds of our invention may be due to the fact that the elongated molecules which are predominantly hydrophilic at the choline end, and predominantly hydrophobic at the opposite end, are surface-active, and that such surface activity not only enables the compounds to penetrate the cornea of the eye more readily, but also causes the differences in pharmacological effects due to the differences in site of action on the cell.

The products of our invention are similar in action to atropine and homatropine. However, the compounds of our invention have advantages over both atropine and homatropine in that, while the degree of mydriasis and cycloplegia produced by our products is, generally speaking, of the same order as that of atropine and homatropine, we have found that where our products have been administered, cycloplegia, and particularly mydriasis, are markedly less prolonged, resulting in a shorter period of visual disability than is experienced in the case of atropine or homatropine. Further, the products of our invention do not produce the marked hyperemia and irritation of the conjunctiva which are incidental to the use of homatropine in many cases. The products of our invention have antiseptic properties.

Among the compounds which fall within the purview of our invention may be mentioned the following representative substances:

N-di-n-butyl carbamyl choline chloride M. P. 98–110° C.

$\beta$-N-di-n-butyl carbamyl-ethyl triethyl ammonium chloride M. P. 68–89° C.

N-diphenyl carbamyl choline chloride M. P. 201–203° C.

N-di-n-butyl carbamyl-$\beta$-methyl choline chloride M. P. 85–105° C.

N-di-n-amyl carbamyl choline chloride M. P. 98–103° C.

N-di-n-butyl carbamyl choline sulfate M. P. 198–200° C.

N-di-iso butyl carbamyl choline chloride M. P. 147–148° C.

In most instances, the compounds mentioned are extremely hygroscopic so that it is difficult to ascertain definite melting points therefor.

These new compounds are very valuable for clinical application in routine intraocular examination and cycloplegic refraction.

For example, we have found that two instillations of a 7.5% aqueous solution of N-di-n-butyl carbamyl choline sulfate into the conjunctival sac produce mydriasis and cycloplegia beginning within twenty minutes and becoming maximal in 60–90 minutes, the reactions of the intraocular muscles usually returning to normal in about 7–12 hours after administration of the substance.

The products of our invention may be obtained by several methods. One such method comprises reacting a tertiary aliphatic amine, as for instance, trimethylamine or tri-ethylamine, with $\beta$-chloro-ethyl-dialkyl carbamate, the alkyl radicals of which contain more than three carbon atoms, or with $\beta$-chloro-ethyl-diaryl carbamate. The resulting product, a chloride, may be converted to other salts, or to the base, by known methods. Thus the chloride may be converted to other salts by reacting the same with a silver salt which is more soluble in water than silver chloride.

The following examples illustrate methods of carrying out the present invention, but it is to be understood that these examples are given by way of illustration and not of limitation.

*Example I*

50 gms. of β-chlor-ethyl-chlorcarbonate are dissolved in ether and cooled to 0° C. An ether solution containing 86.5 gms. of di-n-butylamine is added, and the mixture is stirred carefully to maintain the temperature at 0° C. Ether is used in sufficient volume to permit adequate mixing. Most of the di-n-butylamine hydrochloride precipitates, and is filtered off. The filtrate is extracted with dilute hydrochloric acid to remove any unreacted di-n-butylamine in the form of di-n-butylamine hydrochloride.

The ether and water fractions are separated, and the ether fraction is distilled at atmospheric pressure to remove ether. The residue is then distilled under reduced pressure and the fraction boiling at 151-2° C./18 mm. (uncorrected) is collected as one fraction. That fraction is pure β-chlor-ethyl-di-n-butyl-carbamate, a colorless liquid with a refraction index of 1.446–1.448 at 26° C.

21 gms. of β-chlorethyl-di-n-butyl-carbamate and 6 gms. of condensed trimethylamine are placed in a vessel, and the vessel is closed firmly and maintained at 85° C. A white, crystalline solid forms. After 18 hours, the vessel is opened and placed in vacuo to remove any unreacted trimethylamine. The final product is washed with anhydrous ether in a dry atmosphere to remove any unreacted β-chlorethyl-di-n-butyl-carbamate. N-di-n-butyl-carbamyl choline chloride occurs as a highly hydroscopic, snow-white crystalline compound, melting at about 98–110° C. A 5% aqueous solution of the product has an air-water interfacial tension of approximately 41 dynes/cm. at 25° C. The pH of aqueous solutions thereof is approximately neutral.

*Example II*

8 gms. of β-chlorethyl-di-n-butyl carbamate are placed in a vessel with 4 gms. of triethylamine. An equal volume of absolute methyl alcohol is added to the mixture. The vessel is sealed and maintained at 120° C. for 12 hours, after which the tube is cooled to room temperature and opened. The solvent (methyl alcohol) and unreacted triethylamine are removed by evaporation under reduced pressure. After evaporation is completed, two volumes of acetone are added, which results in the precipitation of a pharmacologically inactive fraction which is removed by filtration. Acetone is evaporated from the filtrate under reduced pressure. Two volumes of ethyl ether are added to the acetone-free residue, and the active principle is extracted with distilled water. Unreacted β-chlorethyl ester of di-n-butyl carbamic acid remains in the ether fraction. When the water is evaporated under reduced pressure, the product, β-N-di-n-butyl carbamyl-ethyl triethyl ammonium chloride remains in the form of white, hygroscopic crystals melting at about 68–89° C. A 7% aqueous solution of the product has an air-water interfacial tension of approximately 42.0 dynes/cm. at 39° C.

*Example III*

10 gms. of β-chlorethyl-chlorcarbonate are mixed with 22.2 gms. of diphenylamine, and refluxed for two hours on a water bath. The solid mixture is then refluxed with 150 cc. of 60–70° ligroin, and filtered hot to remove diphenylamine hydrochloride. The filtrate is cooled to 0° C., and β-chlorethyl-diphenyl-carbamate crystallizes out and is separated by filtration. It is then recrystallized from 60° ligroin. The product occurs in the form of white crystals melting at about 72° C.

14 gms. of β-chlorethyl-diphenyl-carbamate are placed in a container with 10 gms. of a 30% trimethylamine solution in absolute alcohol. The container is closed firmly and heated at 85° C. for 16 hours. The solution is then cooled to 0° C. and N-diphenyl-carbamylcholine chloride is precipitated by the addition of acetone. The product is recrystallized from acetone. It occurs in the form of non-hygroscopic, snow-white crystals melting at about 204° C. (uncorrected). It is soluble in water and alcohol; slightly soluble in acetone.

*Example IV*

32 gms. of β-chlor-isopropyl-chlorcarbonate are dissolved in ethyl ether, and the solution is cooled to 0° C. An ethyl ether solution containing 50 gms. of di-n-butylamine is added, and the mixture is stirred carefully to maintain the temperature at 0° C. Most of the di-n-butylamine hydrochloride formed precipitates, and is filtered off; the filtrate is extracted with dilute hydrochloric acid to remove any unreacted di-n-butylamine in the form of di-n-butylamine hydrochloride. The ether and water fractions are separated, and the ether fraction is distilled at atmospheric pressure to remove ether. The residue is then distilled under reduced pressure, and the fraction boiling at 158–59° C./20 mm. (uncorrected) is collected as one fraction. That fraction is pure β-chlorisopropyl-di-n-butyl-carbamate, a colorless liquid with a refractive index of about 1.446 at 26° C.

21 gms. of β-chlor-isopropyl-di-n-butyl carbamate and 20 gms. of 30% (by weight) trimethylamine in absolute ethyl alcohol are placed in a vessel. The vessel is firmly closed, and maintained at 105° C. After 18 hours, the vessel is opened in a dry atmosphere and placed in vacuo to remove any unreacted trimethylamine. Ethyl ether is added to the residue, and the product is extracted with distilled water. After the water is removed in vacuo over $P_2O_5$, the final product, N-di-n-butyl carbamyl-β-methyl-choline-chloride, remains as highly hygroscopic, snow-white crystals melting at about 85–105° C. A 7.5% solution of the product in water has an air-water interfacial tension of approximately 42.5 dynes/cm. at 29.5° C.

*Example V*

50 gms. of β-chlorethyl-chlorcarbonate are dissolved in ether, and the solution cooled to 0° C. An ether solution containing 105 gms. of di-n-amyl amine is added, and the mixture is stirred carefully to maintain the temperature at 0° C. Di-n-amyl amine hydrochloride is precipitated and filtered off; the filtrate is extracted with dilute hydrochloric acid to remove any unreacted di-n-amyl amine, in the form of di-n-amyl amine hydrochloride.

The ether and water fractions are separated, and the ether fraction is distilled at atmospheric pressure to remove ether. The residue is then distilled under reduced pressure, and the fraction boiling at about 178–80°/20 mm. is collected as one fraction. The fraction is pure β-chlorethyldi-n-amyl carbamate, a colorless liquid with a refraction index of 1.448–1.450 at 20° C.

24 gms. of β-chlor-ethyl-di-n-amyl-carbamate and 6 gms. of condensed trimethylamine are placed in a vessel, and the vessel is closed firmly and maintained at 85° C. A white crystalline solid forms. After 18 hours, the vessel is opened and placed in vacuo to remove any unreacted trimethylamine. The residue is washed with anhydrous ether in a dry atmosphere to remove any unreacted β-chlorethyl-di-n-amyl-carbamate. The final product, N-di-n-amyl carbamyl choline chloride, occurs in the form of highly hygroscopic, snow-white crystals, having a melting point of about 98–103° C. An aqueous solution containing 5% of the product has a surface tension of approximately 38.5 dynes/cm. at 29° C. Aqueous solutions thereof have approximately neutral pH.

*Example VI*

50 gms. of β-chlorethyl-chlorcarbonate are dissolved in ether, and the solution is cooled to 0° C. An ether solution containing 86.5 gms. of di-iso-butylamine is added, and the mixture is stirred carefully to maintain the temperature at 0° C. Most of the di-iso-butylamine hydrochloride precipitates, and is filtered off; the filtrate is extracted with dilute hydrochloric acid to remove any unreacted di-iso-butylamine (in the form of di-iso-butylamine hydrochloride).

The ether and water fractions are separated, and the ether fraction is distilled at atmospheric pressure to remove ether. The residue is then distilled under reduced pressure, and the fraction boiling at 144–6° C./20 mm. (uncorrected) is collected as one fraction. That fraction is pure β-chlorethyl-di-iso-butyl-carbamate, a colorless liquid with a refraction index of 1.446–1.448 at 26° C.

21 gms. of β-chlorethyl-di-iso-butyl-carbamate and 6 gms. of condensed trimethylamine are placed in a vessel, and the vessel is firmly closed and maintained at 85° C. A white, crystalline solid forms. After 18 hours, the vessel is opened, and placed in vacuo to remove any unreacted trimethylamine. The product is washed with anhydrous ether in a dry atmosphere to remove any unreacted β-chlorethyl-di-iso-butyl carbamate.

The final product, N-di-iso-butyl carbamyl choline chloride, occurs in the form of highly hygroscopic, snow-white crystals, melting at about 147–148° C. A 5% aqueous solution of the product has an air-water interfacial tension of approximately 41.5 dynes/cm. at 29.5° C. Aqueous solutions thereof have approximately neutral pH.

*Example VII*

7 gms. of di-n-butyl-carbamylcholine chloride are dissolved in 50 cc. of distilled water, and 4 gms. of finely powdered silver sulfate are added. The vessel is sealed, and shaken at room temperature until a filtered sample does not yield a precipitate when silver nitrate is added. The mixture is then filtered to remove precipitated silver chloride. The filtrate is dried in vacuo, and the residue is extracted with anhydrous ethyl alcohol. N-di-n-butyl carbamyl choline sulfate is precipitated from the alcohol solution by addition of anhydrous ethyl ether. It occurs in the form of slightly hygroscopic, white crystals melting at about 198–200° C. A 7.5% aqueous solution thereof has an air-water interfacial tension of 39–40 dynes/cm. at 29° C.

Modifications may be made in carrying out the present invention without departing from the spirit and scope thereof, and we are to be limited only by the appended claims.

We claim:

1. An essentially non-toxic surface-active compound of the formula

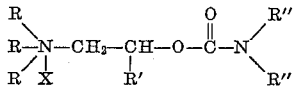

wherein R is selected from the group consisting of methyl and ethyl radicals; X is an anion; R' is selected from the group consisting of hydrogen and methyl radicals; and R'' is selected from the group consisting of alkyl radicals containing at least four carbon atoms, and the phenyl radical.

2. N-di-n-butyl carbamyl choline chloride.
3. N-di-n-amyl carbamyl choline chloride.
4. N-di-n-butyl carbamyl choline sulfate.

KENNETH C. SWAN.
NORMAN G. WHITE.